United States Patent [19]
Swander, Jr.

[11] 3,921,765
[45] Nov. 25, 1975

[54] AUTOMATIC BRAKE SLACK ADJUSTER
[75] Inventor: Kenneth D. Swander, Jr., Lawrence, Kans.
[73] Assignee: Aeroquip Corporation, Jackson, Mich.
[22] Filed: Feb. 19, 1974
[21] Appl. No.: 443,664

[52] U.S. Cl. .................... 188/79.5 K; 188/196 BA
[51] Int. Cl.² ......................................... F16D 65/56
[58] Field of Search ....... 188/79.5 K, 79.5 P, 196 F, 188/196 B, 196 A, 196 M

[56] References Cited
UNITED STATES PATENTS

| | | | |
|---|---|---|---|
| 2,294,974 | 9/1942 | Freeman | 188/79.5 K |
| 3,351,163 | 11/1967 | Sander et al. | 188/79.5 K X |
| 3,351,164 | 11/1967 | Svensson | 188/79.5 K X |
| 3,428,154 | 2/1969 | Lodjic et al. | 188/79.5 K X |

Primary Examiner—Duane A. Reger
Attorney, Agent, or Firm—Thomas M. Scofield, Esq.

[57] ABSTRACT

An automatic brake slack adjuster is provided which includes a first drive unit; a second drive unit; an intermediate shaft unit positioned therebetween, and a body member defining cavities to receive the drive units and intermediate shaft unit. The second drive unit further includes a drive shaft having a worm rotatably mounted thereon. A first clutch means operable in a first rotational direction is positioned between the worm and the drive shaft and a second clutch means operable in a second opposite rotational direction is positioned between the gear and the body member.

11 Claims, 8 Drawing Figures 3,921,765

AUTOMATIC BRAKE SLACK ADJUSTER

BACKGROUND OF INVENTION

This invention relates to an automatic brake slack adjuster and more particularly is concerned with an automatic brake slack adjuster of the dual-bore type having a dual clutch means therein for automatic adjustment of vehicle brakes.

Automatic brake slack adjusters are generally mounted between the brake operating shaft and the brake actuating rod. The function of an automatic slack adjuster is to compensate for wear in the vehicles brake lining by automatically maintaining a predetermined amount of slack in the brake actuating rod. This provides a constant predefined brake clearance for a uniform position of the brake actuator.

The prior art discloses numerous types of automatic brake slack adjusters. An automatic brake slack adjuster should be reliable in operation and should provide a trouble free long operating life with minimum maintenance. Prior art slack adjusters generally do not satisfy these requirements.

SUMMARY OF THE INVENTION

The novel automatic brake slack adjuster is adapted for positioning between a brake operating shaft and a brake actuating rod. The adjuster includes a first drive unit, a second drive unit, an intermediate shaft unit positioned between the first and second drive units and a body member defining cavities to receive the first and second drive units and intermediate shaft unit. Unlike the prior art, the automatic brake slack adjuster includes a second drive unit having both a first clutch means operable in a first rotational direction and a second clutch means operable in a second opposite rotational direction. In the novel automatic brake slack adjuster, the first and second clutch means interact to provide reliable non slip operation during automatic slack adjustment. In addition, the first and second clutch means are simplified in construction resulting in economies in manufacturing. The simplified construction is also expected to provide the adjuster with a long trouble free operating life requiring minimum maintenance.

DESCRIPTION OF THE PREFERRED EMBODIMENT

Figures 1, 2:
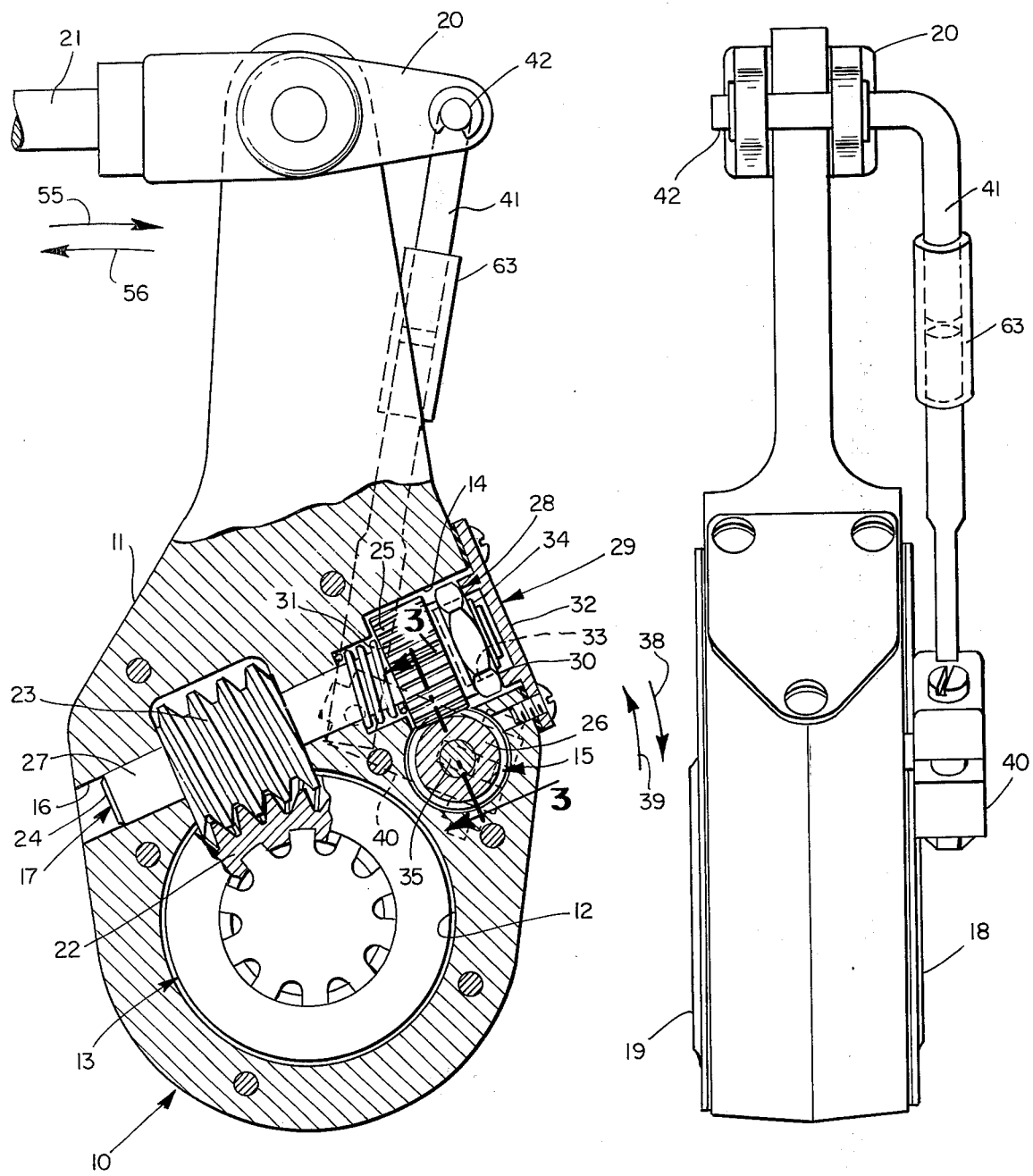
FIG. 1 is a partial sectional side elevational view of the novel automatic brake slack adjuster.
FIG. 2 is a rear elevational view of the novel automatic brake slack adjuster of FIG. 1.

FIG. 1 illustrates an automatic brake slack adjuster 10 of the double-bore type. The adjuster 10 includes a body member 11 defining a first cavity 12 to receive a first drive unit 13, a second cavity 14 to receive a second drive unit 15 and a third cavity 16 to receive an intermediate shaft unit 17 positioned between the first drive unit 13 and the second drive unit 15. A first cover plate 18 and a second cover plate 19 are attached to the body member 11 as shown in FIG. 2. A yoke 20 is attached to one end of the adjuster 10 for connection of the brake actuating rod 21.

The first drive unit 13 shown in FIG. 1 includes a first worm gear 22 which is internally splined for connection to a brake operating shaft (not shown) and a first worm 23 which engages the first worm gear 22. The first worm 23 is mounted on the left end 24 of the connecting shaft unit 17.

Figure 3:
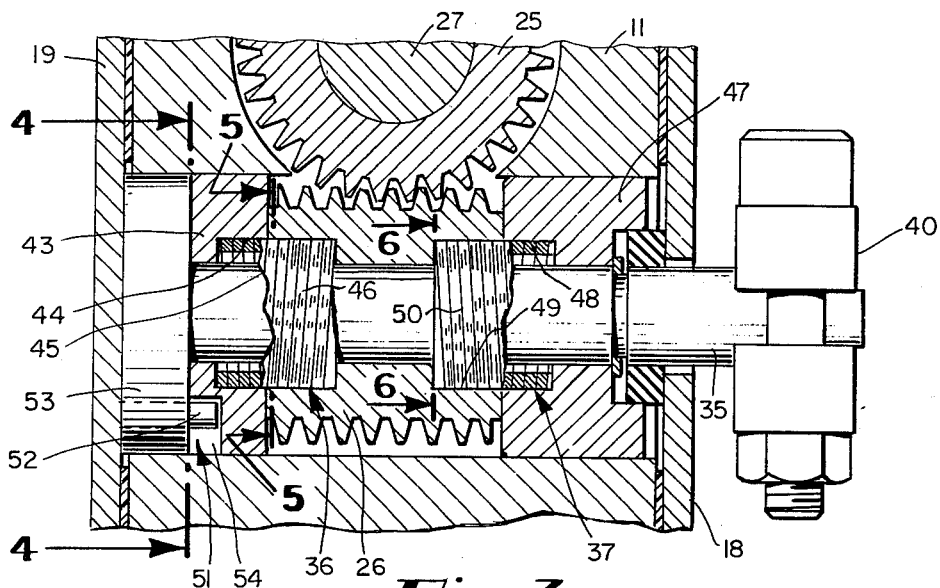
FIG. 3 is an enlarged sectional view of a portion of the automatic brake slack adjuster of FIG. 1 shown on Section 3—3.

The second drive unit 15 shown in FIGS. 1 and 3 includes a second gear 25 which is slidably mounted on the right end of the connecting shaft unit 17, and a second worm 26 which engages the second gear 25.

The intermediate shaft unit 17 also includes a connecting shaft 27 and manual adjustment means 28 to permit manual adjustment during initial and subsequent installation on a vehicle. The manual adjusting means 28 includes disengagement means 29 for disengagement from the second drive unit 15 and holding means of hexagonal shape 30 for manual rotation of the connecting shaft 27. The disengagement means 29 includes a spring 31 recess mounted in the body member 11 between the body member 11 and the second gear 25 as shown in FIG. 1 to urge the second gear along the connecting shaft 27 and out of engagement with the second worm 26, and a retaining cover plate 32 screw mounted to the body member 11, to prevent disengagement during normal use. The second gear 25 is slidably keyed or splined on the connecting shaft 27 and includes a counter bore 33 at the right side to permit it to slide over a retaining ring 34 at the right end of the connecting shaft 27.

In the second drive unit 15, shown in FIGS. 1 and 3 the second worm 26 is rotably mounted on the drive shaft 35. The second drive unit 15 also includes a first clutch means 36 and a second clutch means 37. The first clutch means 36 is operable or engaged only for a first rotational direction or a counter-clockwise rotation (shown by the arrow 39) and the second clutch means 37 is operable or engaged only for a second opposite rotational direction or a clockwise rotation (shown by the arrow 38). Both clutch means 36 and 37 respectively are disengaged for opposite directional rotation. Engagement is defined to mean that when the drive shaft 35 is rotated the first clutch means 36 locks together the first or movement limiting bearing 43 and the second worm 26 or the second clutch means 37 locks together the second worm 26 and stationary bearing member 47. The second drive unit 15 also includes a crank arm 40 clamped to the drive shaft 35 and a link 41 connecting the brake actuating rod 21 at pivot 42 with the crank arm 40.

In the preferred embodiment, the first clutch means 36 includes a first or movement limiting bearing 43 rotatably mounted in the body member 11 and positioned against the left side of the second worm 26. The first bearing member 43 includes a counterbore 44 and the second worm 26 includes a first counterbore 45 as shown in FIG. 3. A first clutch spring 46 is positioned within the counterbores 44 and 45. In the preferred embodiment, the first clutch spring 46 is a left-wound closed helical spring formed from square spring wire.

The second clutch means 37 includes a second or stationary bearing member 47 pressed into the body member 11 and positioned against the right side of the second worm 26. The second bearing member 47 includes a counterbore 48 and the second worm 26 includes a second counterbore 49 as shown in FIG. 3. A second clutch spring 50 is positioned within the counterbores 48 and 49. The second clutch spring 50 is a right-wound closed helical spring also formed from square spring wire. The outside diameters of each of the springs 46 and 50 are 0.005 to 0.010 inches larger than the inside diameters of the counterbores 44, 45, 48 and 49.

In the embodiment shown in FIGS. 1 and 3, the first clutch means 36 also includes a dwell means 51 to provide an initial dwell prior to engagement of the first clutch means 36. The dwell means 51 better shown in FIG. 4 includes a crank pin 52 extendng outward from an enlarged diameter portion 53 of the drive shaft 35. The crank pin 52 extends into a slot 54 within the first bearing member 43.

In one embodiment shown in FIG. 1 the operating means or link 41 includes a resilient portion 63. The resilient portion 63 causes the link to flex thereby preventing accidental adjustment of the actuator if the link is struck by flying stones or other debris.

Figures 4, 5, 6:
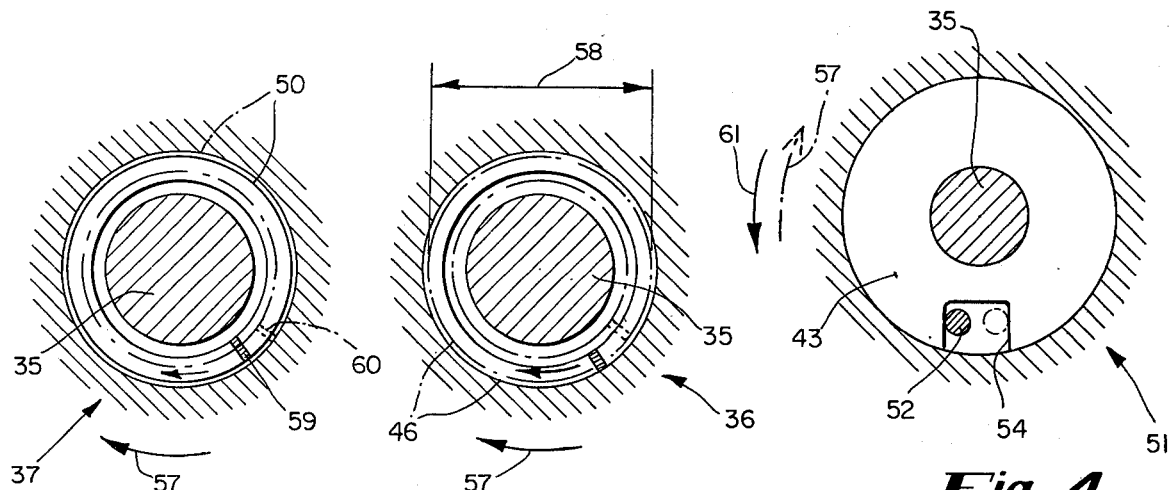
FIG. 4 is a partial sectional view of a dwell means of the novel automatic brake slack adjuster of FIG. 3 shown on Section 4—4.
FIGS. 5 and 6 are a sectional view of Sections 5—5 and 6—6 respectively of the second drive unit of FIG. 3 illustrating the operation of the first and second clutch means upon rotation of the drive shaft in a first rotational direction.

In the operation of the novel automatic brake slack adjuster 10, each complete braking cycle of the actuator moves the brake actuating rod 21 shown in FIG. 1 in a brake application stroke as shown by the directional arrow 55 and in a brake release stroke as shown by the directional arrow 56. During the brake application stroke, the adjuster 10 rotates the brake operating shaft (not shown) thereby applying the vehicle brakes. The clutch operation during the brake application stroke is shown in FIGS. 5 and 6. During the brake application stroke no brake adjustment occurs. On brake application, the link 41 and crank arm 40 rotate the drive shaft 35 in the direction as shown by the directional arrow 57. The first bearing member 43 is rotated with the drive shaft 35 by the crank pin 52. The drive shaft 35 rotates within the second bearing member 47, the clutch springs 46 and 50, and the second worm 26.

The first clutch means 36 is disengaged during the clockwise rotation. The operation of the first clutch means 36 on the clockwise rotation of the drive shaft 35 is illustrated in FIG. 5. The first clutch spring 46 is left-hand wound in a closed helix in a counter-clockwise direction. On a clockwise rotation of the first bearing member 43 (shown by arrow 57), the first clutch spring 46 unwinds to reduce its outside diameter to a new diameter 58 (schematically illustrated with phantom lines in FIG. 5) thereby allowing the first bearing member 43 to rotate or slip on the new outside diameter.

The operation of the second clutch means 37 on clockwise rotation of the initial drive shaft 35 (shown by arrow 57) is illustrated in FIG. 6. The second clutch spring 50 is right hand wound in a closed helix in a clockwise direction. Since the outside diameter of the second clutch spring 50 is larger than the internal diameter of the counterbores 48 and 49, the second clutch spring 50 winds during clockwise rotation thereby increasing its outside diameter to engage and lock together the second bearing member 47 and the second worm 26. During the clockwise rotation, the second clutch spring 50 winds from the original end position 59 to a new end position 60. In practice, the amount of wind-up of the second helical spring 50 is almost negligible or zero since it is installed with the helical coils tightly prewound against each other and is an interference fit with the counterbores 48 and 49. Therefore the second worm 26 does not rotate, but is maintained in its present position.

The automatic slack adjustment occurs on the return stroke of the novel automatic brake slack adjuster 10. The clutch operation during the brake return stroke is shown in FIGS. 7 and 8.

Adjustment of the brakes during the return stroke is preferred since the brakes are disengaged from any braking load. During the return stroke, the automatic slack adjuster 10 is rotated in the direction shown by the directional arrow 56 in FIG. 1. The link 41 rotates the drive shaft 35 counter-clockwise as shown by the directional arrow 61 in FIGS. 7 and 8. The first clutch means 36 is engaged and the second clutch means 37 is disengaged during the counter-clockwise rotation.

Figure 7:
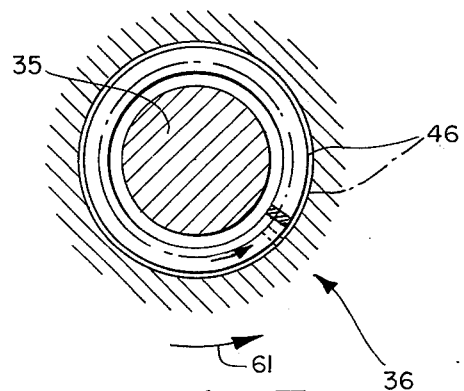

The operation of the first clutch mens 36 on the counter-clockwise rotation of the initial drive shaft is illustrated in FIG. 7. The first clutch means 36 operates only if brake adjustment is required. The first clutch spring 46 on an initial counter-clockwise rotation tends to engage and lock together the first bearing member 43 and the second worm 26. On continued counter-clockwise rotation, the first bearing member 43, rotated by the crank pin 52, also rotates the second worm 26. The second worm 26 in turn rotates the connecting shaft unit 17 through second gear 25 and the first drive unit 13. During the counter-clockwise rotation the second clutch means 37 is disengaged.

Figure 8:
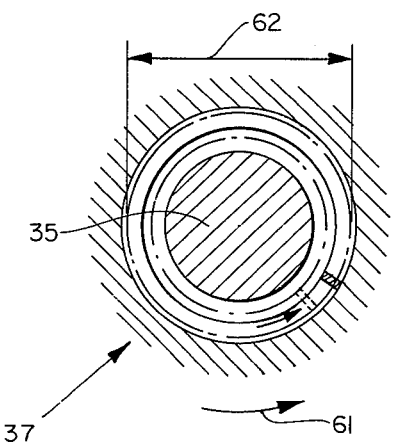
FIGS. 7 and 8 are sectional views similar to Sections 5—5 and 6—6 respectively of the second drive unit of FIG. 3 illustrating operation of the first and second clutch means upon rotation of the drive shaft in a second rotational direction.

The operation of the second clutch means 37 is illustrated in FIG. 8. The second clutch means 37 is disengaged where brake adjustment is required. The second clutch spring 50, on counter-clockwise rotation, decreases in outside diameter to a new smaller outside diameter 62 allowing rotation of the second worm 26.

The dwell means 51 provides a rotational dwell during the counter-clockwise rotation of the drive shaft 35. The rotational dwell provides a definite brake stroke and prevents over adjustment of the vehicle brakes. In the operation of the dwell means 51, the first bearing member 43 is rotated by the crankpin 52 contacting one side of the slot 54. The width of the slot 54 determines the amount of rotational dwell. When the brakes are in proper adjustment, the crankpin 52 moves within the slot 54 and the clutch means 36 and 37 do not operate.

The novel automatic slack adjuster 10 is manually adjusted by first removing the retaining cover plate 32 from the body member 11. With the cover plate 32 removed, the second gear 25, is urged by the spring 31 out of engagement with the second worm 26. The connecting shaft 27 is manually rotated to rotate the final drive 13 thereby rotating the adjuster 10 counter-clockwise about the brake operating shaft (not shown) to tighten the vehicle brakes. The connecting shaft 27 is manually rotated by applying a wrench to the hexagonal shape 30. After initial adjustment is complete, the second gear 25 is then moved into the body member 11 in engagement with the second worm 26 and the retaining cover plate 32 is installed. The novel manual adjustment means 28 permits ease in initial installation and future adjustment.

Generally, the adjuster 10 is used in pairs, that is, one adjuster 10 is used on each side of each vehicle axle. Referring to FIG. 2, a left hand unit is shown. The left hand unit is identified from the link 41 which is on the right side thereof as viewed from the rear of the unit. The front of the unit is attached to the brake actuating rod 21. It can easily be observed that the component parts of the second drive 15 are interchangeable left and right within the second cavity 14. Therefore, a right hand unit can be assembled by reversing the position of the drive shaft 35, the first bearing member 43, second bearing member 47, the link 41 and cover plates 18 and 19.

Although adjustment of the brake slack is described to occcur on the return stroke, adjustment can be made to occur on the application stroke by reversing the first and second clutch springs 46 and 50.

I claim:

1. In a slack adjusting mechanism for vehicle brakes, an actuating arm assemblage comprising a body portion and an elongate actuating arm integral with the body portion,
a first bore in the body portion,
an internally splined first worm gear rotatably mounted in said bore and adapted to receive therethrough a brake-actuating cam shaft,
the actuating arm being adapted for connection with means for rocking the housing in application and release of the brake and the associated brake-actuating cam shaft,
a second bore in the body portion extending at right angles to the turning axis of the worm gear and opening at one end thereof into the first bore,
a connecting shaft rotatably mounted in the second bore and carrying a first worm thereon having driving connection through the first named opening with said first worm gear,
a third bore in the body portion extending acrosss the other end of the second bore and opening thereinto,
a second gear mounted on the connecting shaft with the threads thereof extending into the second named opening,
a drive shaft rotatably mounted in the third bore carrying a second worm thereon having driving connection with the second gear through the second mentioned opening,
a first clutch means communicating between said drive shaft and said second worm,
said first clutch means operable on rotation of said shaft in a first direction to couple the second worm and drive shaft together for rotation one with the other,
and on rotation of the shaft in the opposite direction to free the second worm and drive shaft for rotation of the latter without the former,
and a second clutch means communcating between said second worm and body portion,
said second clutch means operable on rotation of said drive shaft in said first direction to free the second worm and body portion from one another to permit rotation of the drive shaft and second worm together,
and on rotation of the drive shaft in the opposite direction to couple the second worm and body portion together whereby to prevent rotation of the second worm with the drive shaft.

2. A slack adjusting mechanism as in claim 1 including manual adjustment means for disengagement of the second gear with the second worm and rotation of the connecting shaft, whereby to rotate the first worm gear and adjust the brake, said manual adjustment means accessible from the exterior of the body portion.

3. A mechanism as in claim 2 wherein the manual adjustment means includes:
the second gear slidably mounted on said connecting shaft,
removable retaining means normally holding the second gear in engagement with the second worm,
and engaging means on said connecting shaft outboard of the second gear for engagement and manual rotation of said connecting shaft.

4. A slack adjusting mechanism as in claim 2 wherein said first clutch means includes a predetermined dwell therein, whereby rotation of said drive shaft in said first rotational direction does not initially engage said first clutch.

5. A slack adjusting mechanism as in claim 1 wherein said second bore is positioned above each of said first and third bores.

6. A slack adjuster mechanism as in claim 1 wherein the means for rocking the housing in application and release of the brake comprises a brake actuating rod pivotally connected to the elongate actuating arm, and a link rod connecting the brake actuating rod with the drive shaft through a crank arm for two-way rotation of the drive shaft on application and release of the brake, the link rod having a resilient portion intermediate the ends thereof.

7. A slack adjusting mechanism as in claim 1 wherein the first and second clutch means comprise oppositely wound helical springs encircling the drive shaft, same received at the inward ends thereof in opposed recesses in the second worm.

8. A slack adjusting mechanism as in claim 7 wherein the outboard end of one of said helical springs is received in a central inboard recess of a bearing keyed to the drive shaft and the outboard end of the other helical spring is received in a central inboard recess of a stationary bearing member fixed with respect to said body portion.

9. An automatic brake adjuster adapted to be interposed between a brake operating shaft and a brake actuating rod, said brake adjuster comprising:
a first movement reducing drive unit connected to said brake operating shaft;
a second movement reducing drive unit including a drive shaft coupled to a link connected to said brake actuating rod;
a connecting shaft interposed between said first and second drive units and having drive linkages therewith, whereby rotation of the drive shaft in at least one direction will rotate the brake operating shaft;
a body member defining cavities to receive said first and second drive units, said connecting shaft, said drive linkages and said brake operating shaft;
said body member having an integral lever arm connected to said brake actuating rod at a point different from the connection of the latter with said link, whereby oscillation of said brake operating rod and arcuate movement of said adjuster causes said brake operating shaft to advance in small increments;

a pair of clutches interposed in the drive between said link and said brake operating shaft;

said clutches movable between an engaged position for one clutch and a disengaged position for the other clutch which permit movement of the link and drive shaft coupled therewith independently of said brake operating shaft, and opposite positions for said clutches, which opposite positions cause advance of the brake operating shaft upon movement of the link and drive shaft.

10. In an automatic brake adjuster adapted to be interposed between a brake operating shaft and a brake actuating rod, said brake adjuster including:

an actuating arm assemblage comprising a body portion and an elongate actuating arm integral with the body portion, a drive shaft bore in said body portion receiving a drive shaft therewithin for rotation, a connecting shaft bore in said body portion extending at right angles to the drive shaft bore and communicating therewith at one end of the connecting shaft bore and centrally of the drive shaft bore through an opening, a connecting shaft rotatably received in said body portion and connecting shaft bore, the brake actuating rod pivotally connected to the elongate actuating arm and a link rod connected at its other end to the drive shaft through a crank arm, a worm freely rotatably mounted on the drive shaft and a gear fixed to the connecting shaft, said worm engageable with said gear through said opening so rotation of the drive shaft will rotate the connecting shaft when the worm is fixed to the drive shaft, a first clutch means communicating between said drive shaft and said worm, said first clutch means operable on rotation of said drive shaft in a first direction to couple the worm and drive shaft together for rotation, one with the other, and on rotation of the drive shaft in the opposite direction to free the worm and drive shaft for rotation of the latter without the former, and a second clutch means communicating between said worm and said body portion, said second clutch means operable on rotation of said drive shaft in said first direction to free the worm and body portion from one another to permit rotation of the drive shaft and worm together and on rotation of the drive shaft in the opposite direction to couple the worm and body portion together, whereby to prevent rotation of the worm with the drive shaft.

11. In a slack adjusting mechanism for vehicle brakes, an actuating arm assemblage comprising a body portion and an elongate actuating arm integral with the body portion, a first bore in the body portion, an internally splined first worm gear rotatably mounted in said bore and adapted to receive therethrough a brake-actuating cam shaft, the actuating arm being adapted for connection with means for rocking the housing in application and release of the brake and the associated brake-actuating cam shaft, a second bore in the body portion extending at right angles to the turning axis of the worm gear and opening at one end thereof into the first bore, a connecting shaft rotatably mounted in the second bore and carrying a first worm thereon having driving connection trhough the first named opening with said first worm gear, a third bore in the body portion extending across the other end of the second bore and opening thereinto, a second gear mounted on the connecting shaft with the threads thereof extending into the second named opening, a drive shaft rotatably mounted in the third bore carrying a second worm thereon having driving connection with the second gear through the second mentioned opening, and manual adjustment means for disengagement of the second gear with the second worm and rotation of the connecting shaft, whereby to rotate the first worm gear and adjust the brake, said manual adjustment means accessible from the exterior of the body portion, the manual adjustment means including:

the second gear slidably mounted on said connecting shaft, removable retaining means normally holding the second gear in engagement with the second worm, and engaging means on said connecting shaft outboard of the second gear for engagement and manual rotation of said connecting shaft.

* * * * *